Sept. 3, 1946.  S. H. NORTON  2,406,963
VALVE SEAT INSERT ASSEMBLY, AND ASSEMBLY METHOD AND MEANS
Filed Aug. 16, 1943  2 Sheets-Sheet 1
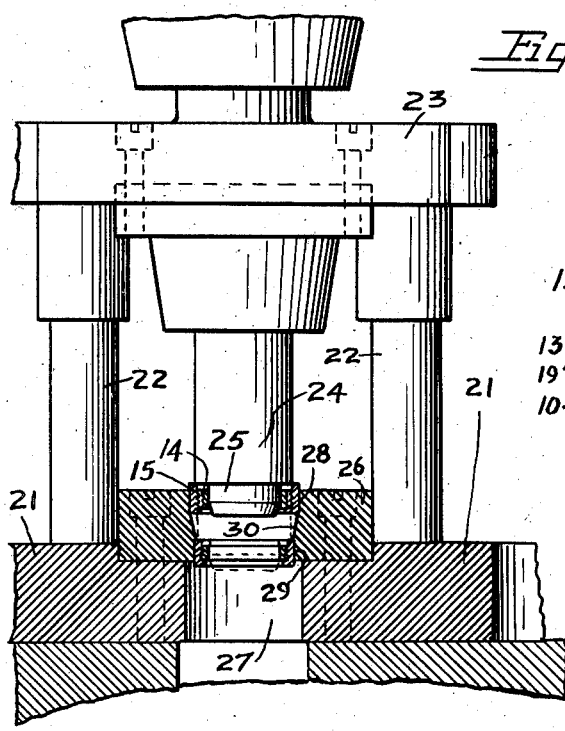
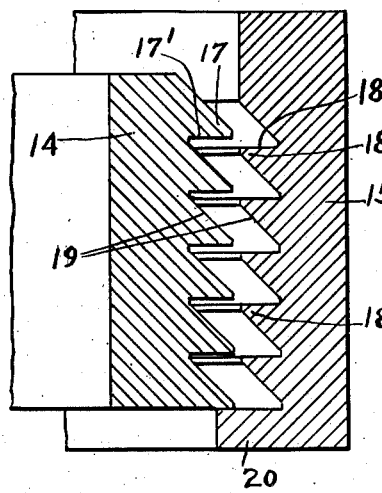
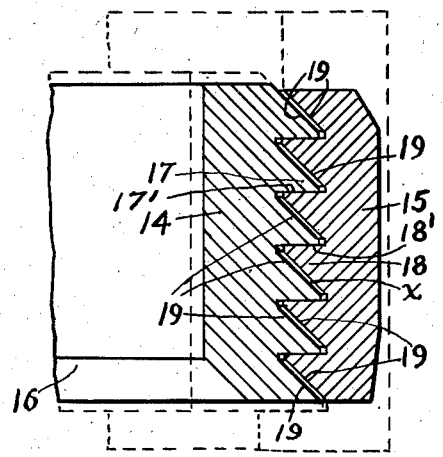
Inventor
SAMUEL H. NORTON Sept. 3, 1946.   S. H. NORTON   2,406,963
VALVE SEAT INSERT ASSEMBLY, AND ASSEMBLY METHOD AND MEANS
Filed Aug. 16, 1943   2 Sheets-Sheet 2
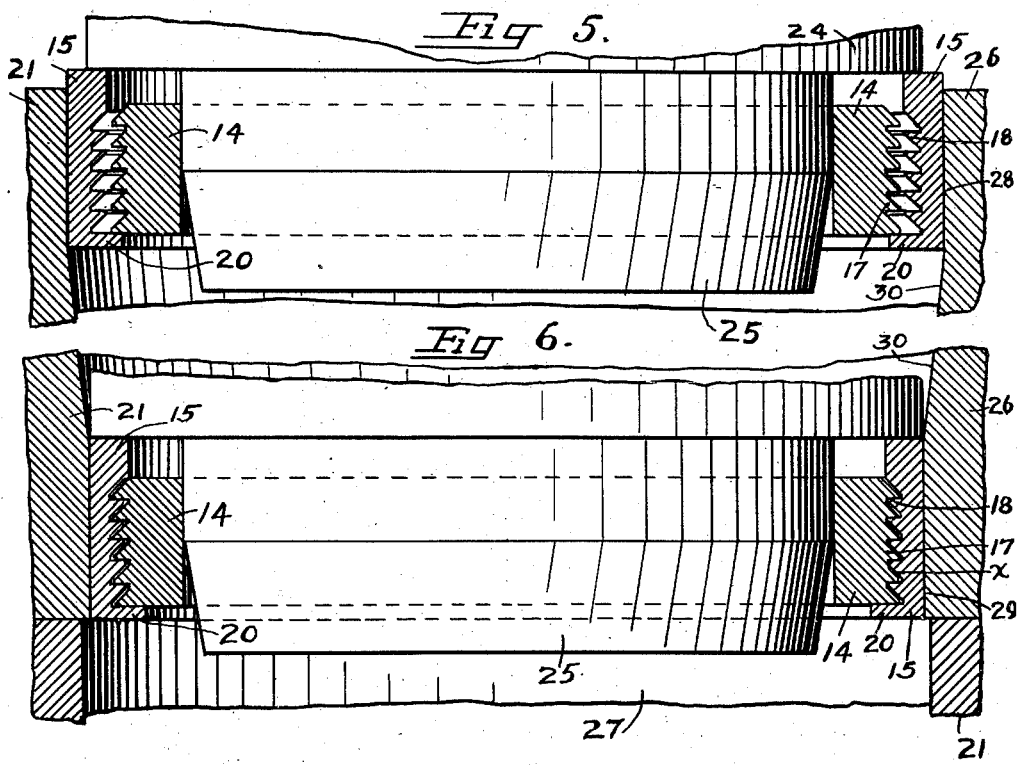

Patented Sept. 3, 1946

2,406,963

UNITED STATES PATENT OFFICE 2,406,963

VALVE SEAT INSERT ASSEMBLY, AND ASSEMBLY METHOD AND MEANS

Samuel H. Norton, Cleveland, Ohio, assignor to Thompson Products, Inc., Cleveland, Ohio, a corporation of Ohio Application August 16, 1943, Serial No. 498,900

9 Claims. (Cl. 123—188)

1

This invention relates to an improved valve seat insert assembly and method and means for assembling the elements in such assembly.

In engines, such as internal combustion engines, valve seat inserts are usually provided at the mouth of ports to be controlled by valves. These inserts are usually of wear and heat resistant material as for example, tungsten alloy, while the engine block or head through which the ports extend is of material having a different co-efficient of expansion, as for example, cast iron or steel. The problem is to prevent distortion or warping of the valve bearing insert element during unequal expansion or contraction of this seat element and the surrounding portion of the block or head.

An important object of my invention is to provide a valve seat insert assembly comprising inner and outer annular concentric members, the inner member being the seat member provided with a seat surface for a valve, while the outer or retainer member for the seat member is adapted to be press fitted into a recess surrounding the end of the port to be controlled, the two members being normally separate but, before insertion into the recess, being interconnected against relative axial displacement with sufficient clearance left therebetween so that during unequal expansion or contraction of the members, the seat member will not be subjected to undue radial pressure which might tend to cause distortion or warping thereof.

A further object of the invention is to provide improved means for permanently interconnecting the two members before insertion of the assembly into the port surrounding recess, with such interconnection, after insertion of the assembly in the recess, holding the two members against axial displacement but permitting relative radial movement sufficient to protect the inner or seat member against distortion or warping.

Still another object is to provide improved method and means for interconnecting the two members to form the insert assembly.

Another important object is to provide inner and outer members, before assembly thereof, with annular parallel external and internal teeth respectively of right angle triangular cross-section with the flat sides of the teeth in planes at right angles to the axis of the respective members and with the pitch of the teeth on the outer member less than the pitch of the teeth on the inner member, and with the diameters of the members at the teeth points being such that the inner

2 member may be snugly slipped into the outer member, and to then subject the outer member with the inner member therein to a contracting die in accordance with one method, or to subject the inner member to an expanding die in accordance with another method, for displacement of the metal of the die engaged member to bring the teeth of the members into accurate mesh with the flat sides of the respective teeth in overlapping and abutting engagement but with clearance between the teeth for relative radial movement of the members as when they will be subjected to unequal expansion or contraction.

My improved insert assembly and the means and method for assembly will be readily understood from the drawings, in which:

Figure 1 is a diametral section showing a portion of an engine block and with my improved insert in place thereon to support a valve;

Figure 2 is an enlarged radial section showing the inner and outer members assembled ready for the die operation;

Figure 3 is a similar radial section showing in full lines the finished assembly with the teeth of the members in active meshing engagement, the dotted lines showing the stock that has been machined away from the assembly after it left the die structure;

Figure 4 is a front elevation, partly in section, of a die structure and the formation of an insert assembly thereby;

Figure 5 is an enlarged front elevation of the lower part of the die structure with the assembly in cross-section and before the members thereof are interconnected;

Figure 6 shows the structure of Figure 5 and the die operation for interconnecting the insert members;

Figure 7 is a section of the die structure by means of which the inner member of the insert assembly may be radially expanded for interengagement of its teeth with the teeth of the outer member; and Figure 8 shows the die structure of Figure 7 performing the expanding operation of the inner member.

Referring to Figure 1, 10 indicates the valve block of an internal combustion engine through which extends a port passageway 11 to be controlled by a valve 12. The block has the annular recess 13 of rectangular cross-section surrounding the mouth of the port and in this recess my improved valve seat assembly is inserted. This insert assembly comprises the inner annular member 14 and the outer member 15 which surrounds the inner member and has press fit in the recess, the inner member having the beveled seating surface 16 for the valve 12.

On its outer side the inner or seat member 14 has a number of annular teeth 17 of right angle triangular section with the annular top flat surfaces 17' of the teeth in planes at right angles to the axis of the member and with the teeth equally spaced apart in axial direction. On its inner side the outer or ring member 15 has complementary teeth 18 whose lower flat surfaces 18' are in planes at right angles to the axis of the member to overlap and abut the top surfaces 17' of the teeth on the inner member. As the outer member 15 is forced into the recess 13 with a press fit, the flat surfaces of the respective teeth will come into abutment and the inner member will be held with its bottom surface intimately in engagement with the bottom of the recess 13. The inclined faces 19 of the teeth on the inner and outer members are opposed to each other with intervening clearance space X to permit relative axial movement of the outer and inner members but with the flat surfaces of the teeth remaining in abutting engagement to hold the members against axial displacement and to keep the inner member seated against the bottom of the recess.

With the two part insert assembly, the outer member 15 may be of the same metal as the cylinder block 10 or of metal whose co-efficient is such that this outer member will at all times maintain tight fit in the recess 13 under all operating conditions of the valve, while the inner or valve seating member may be of high heat and wear resisting material, such as, tungsten alloy. Where the cylinder block and the outer member 15 are of such material as cast iron, steel, aluminum or other suitable material, the co-efficient of said materials may be materially different from that of the inner or seating member, and under certain temperature conditions the radial contraction of the block and the outer member may be greater than the radial contraction of the seat member, and under other temperature conditions the radial expansion of the seat member may be greater than that of the block and outer member. For this reason the clearance X is provided between the outer and inner members so that under such unequal expansion or contraction the inner member will not be subjected to radial pressure tending to distort or warp the same.

Figure 2 shows the forms of the inner and outer members before they are interengaged by die operations, and for such die operations the members are turned upside down, as shown on Figure 2. The diameter of the inner member at the points of the teeth is less than the diameter of the outer member at the points of the teeth so that the inner member may be snugly passed down through the outer member. The teeth on the inner member are equally spaced apart and likewise the teeth on the outer member are equally spaced apart, but the pitch of the teeth on the outer member is less than that of the teeth on the inner member, that is, there are more teeth per inch on the outer member than there are on the inner member. When the members are thus turned upside down and assembled as shown on Figure 2, the inner member may rest on an annular ledge 20 provided at the bottom of the outer member with its lower tooth close to the lower tooth on the outer member and then the distance between the flat faces of the teeth on the inner and outer members will gradually increase upwardly, owing to the pitch differential. The outer member is extended axially upwardly a distance beyond the inner member, as shown on Figure 2 and the assembled members are now ready for insertion into the die structure shown on Figures 4, 5 and 6. This die structure operates on the outer member 15 and is shown as comprising a base block 21 from which guide posts 22 extend for a ram structure 23 from which the cylindrical punch 24 extends downwardly and terminates in a pilot end 25. Mounted on the base 21 is the annular die block 26 having a passageway therethrough in alignment with the discharge passageway 27 in the base 21. The passageway through the die block 21 comprises the upper cylindrical portion 28 and the lower cylindrical portion 29 between which extends the frusto-conical or contracting die surface 30. When the ram structure 23 is withdrawn from the die block, the assembly of the inner and outer members 14 and 15, shown enlarged on Figure 2, is set into the upper portion 28 of the die block, and when the ram is moved down, the pilot end 25 of the punch enters the inner member 14 while the punch 24 engages with the upper end of the outer member 15. While the punch moves downwardly to exert pressure against the outer member, the pilot end 25 will move easily through the inner member 14. Figures 5 and 6 more clearly show the die operation. As the outer member 15 is forced downwardly by the punch, its lower end encounters the frusto-conical contracting die surface 30 and as this downward movement continues, the outer member 15 is contracted or shrunk radially inwardly progressively from the lower end to the upper end thereof, such contracting movement of the outer member and displacement of the metal therein resulting in axial elongation of the outer member progressively from the lower end to the upper end thereof, and, when the outer member has been moved through the contracting surface 30 of the die block, the radial contraction and axial elongation thereof will have brought the teeth on the outer member into complete axial intermesh with the teeth on the inner member with the flat surfaces 17' and 18' of the respective teeth in intimate engagement and overlap, and the two insert members are thus securely interengaged and interlocked. The radial contraction of the outer member is such that after complete interengagement of the teeth axially, the clearance space $x$ will be left between the opposed inclined faces 19 of the teeth, as shown on Figures 6 and 3.

After such interlock of the insert members in the contracting zone 30 of the die block 26, the interlocked assembly is pushed through the lower zone 29 of the die block and into the discharge space 27 of the base 21. The interconnected members now have surplus stock, dotted lines Figure 3, cut away therefrom, and by proper machining the members are given their final form as shown by the full lines on Figure 3, the insert assembly being now ready, when turned downside up, to be inserted in service position, as, for example, in the recess of the engine block shown on Figure 1.

Instead of subjecting the outer member 15 to die operation for interconnection of the two members 14 and 15, such interconnection may be effected by subjecting the inner member 14 to die operation. Such operation is indicated by Figures 7 and 8. The assembly is inserted into the rectangular recess 31 in the die block 32, with the outer member 15 fitting into the recess and resting against the bottom thereof and with the inner member 14 resting on the recess bottom to overhang the passageway 33 through the die block. The punch 34 has the pilot end 35 between which and the punch body is the frustoconical die surface 36. The punch pilot end fits easily into the insert member 14 and holds this member aligned concentric with the outer insert member 15 while the punch moves downwardly to apply its surface 36 to the inner member for outward radial expansion thereof for interconnection of its teeth with those of the outer member 15. Instead of seating the inner member 14 in the die block recess before operation of the punch, the inner member could be slipped over the pilot end 35 of the punch and frictionally held thereon as by a spring ring 37. Then, upon downward movement of the punch, the inner member will be carried through the outer member 15 and into abutment with the bottom of the recess 31 for engagement then with inner member of the die surface 36.

The engagement of the die surface 36 with the inner member 14 will radially expand the inner member 14 progressively of the lower end thereof, and at the same time will axially contract the inner member with the result that, after the die operation, the teeth of the inner and outer members will be in complete mesh axially with the flat face 17' on the inner member overlapping and abutting engagement with the flat face 18' on the outer member 15, the radial expansion being such that the desired clearance will be maintained between the opposed inclined portions of the teeth on the members. The assembled and interconnected members will then be machined to final form and dimension ready for service.

Figure 8 shows the die punch at the end of its die operation, and when the punch is moved upwardly, the insert assembly will encounter suitable stripper means 38 for stripping of the assembly from the punch.

If the inner and outer members of the insert are of metal which can be worked in a die, then the interconnection of the members could be effected either by contraction of the outer member or by expansion of the inner member. However, where the outer member is of material, such as cast iron, which cannot be die operated, interconnection of the members would be accomplished by expansion of the inner or seat member which is usually of some form of heat resisting steel which can readily respond to die operation. On the drawings the dimensions of the teeth are considerably exaggerated. Actually in ordinary die insert assemblies, the depth of the teeth would be a matter of only a few one-hundredths of an inch. Therefore, comparatively little radial contraction of the outer member or radial expansion of the inner member would be required to effect the tooth interconnection, and the die pressure required would be correspondingly moderate.

I have disclosed a practical and efficient embodiment of the features of my invention but I do not desire to be limited to the exact construction, arrangement and operation shown and described as changes and modifications may be made without departing from the scope of the invention.

I claim as follows:

1. A preformed valve seat insert comprising an annular seat member and an annular surrounding retainer member, said seat member having annular teeth on its outer side and said retainer member having annular complementary teeth on its inner side, said teeth on said members having overlapping faces in planes at right angles to the axis of the members, and the outer surfaces of the teeth on said members having clearance space therebetween for permitting relative expansion or contraction of the members.

2. A preformed valve seat for insertion in a recess surrounding a port passageway to be controlled, said assembly comprising an annular seat member and a surrounding annular retainer member for holding the seat member in the recess, said seat member and said retainer member having respectively outer and inner annular teeth thereon in intermeshing engagement, said teeth being of right angle triangular cross-section having flat annular faces in planes at right angles to the axis of these members and annular inclined faces between said flat faces, said teeth intermeshing with their flat faces overlapping whereby when said retainer member is secured in a recess said seat member will be securely axially held therein, there being clearance spaces between the opposed inclined faces of the teeth on said members for permitting relative radial expansion or contraction of said members under temperature variations.

3. A pre-formed valve seat assembly for insertion in a recess surrounding a port passageway to be controlled, comprising an inner annular member providing a valve seat and an outer annular retainer member surrounding said inner member and being of outer diameter for insertion into said recess with tight fit, said inner and outer members having respectively on their outer and inner sides annular teeth with flat faces on one of their sides in planes at right angles to the axis of said members and being in mesh with their flat faces overlapping whereby to prevent axial displacement of said members and whereby the inner member will be held against the bottom of said recess when said outer member is inserted therein, there being sufficient clearance space between the ends of the teeth on said members for permitting relative radial expansion or contraction of said members under temperature variations.

4. A pre-formed valve seat structure for insertion in a recess surrounding a port passageway to be controlled, said structure comprising an inner annular member providing seating surface for a valve for control of said passageway and an outer annular member surrounding said inner member and being of outer diameter for insertion in said recess to have tight fit therein, annular teeth on the outer side of said inner member of right angle triangular section to present flat annular faces in planes at right angles to said member axis, complementary annular teeth on the inner side of said outer member of right angle triangular cross-section for presenting flat annular surfaces in planes at right angles to said member axis, the teeth of said members being in mesh with the flat surfaces of the teeth on the outer member in overlapping engagement with the flat surfaces of the teeth on said inner member whereby said members will be held against axial separation and whereby when said outer member is inserted into said recess the inner member will be axially held against the bottom of the recess, said members being of metals having different co-efficients of expansion, there being clearance spaces between the opposed inclined faces of the teeth on said members whereby to permit relative radial expansion or contraction of said members under temperature variations and to thereby prevent subjection of said inner seat member to excessive distortion or warping pressure.

5. The method of interconnecting the inner and outer annular concentric members in which said members have on their opposed sides complementary annular teeth and teeth grooves primarily out of mesh and with the pitch of the teeth and grooves on one member different from that of the pitch on the other member, which consists in subjecting mechanically by die operation the material of one of said members progressively to combined radial and axial displacement for equalization of the pitch and intermesh of the teeth, and terminating said displacement before the teeth are bottomed in the grooves to accommodate radial expansion and contraction of the members.

6. The method for interconnecting against axial separation the inner and outer annular concentric members in which said members have on their opposed sides complementary annular teeth and teeth grooves of right angle triangular cross-section to provide annular flat surfaces in planes at right angles to the axis of the members and in which the pitch of the teeth and grooves on one member is different from the pitch of the teeth and grooves on the other member, which comprises subjecting mechanically by die operation the material of one of said members to progressive combined radial and axial displacement to effect equalization of the pitch and intermeshing of the teeth with their flat surfaces overlapping, and terminating said displacement before the teeth are bottomed in the grooves to accommodate relative expansion and contraction of the members.

7. The method for interconnecting against axial separation the inner and outer annular concentric metal members of a valve seat insert in which said members have on their opposed sides complementary annular teeth and teeth grooves of right angle triangular cross-section to provide annular flat surfaces in planes at right angles to the axis of the members and in which the pitch of the teeth and teeth grooves on one member is different from the pitch of the teeth and grooves on the other member, which comprises subjecting mechanically by die operation the metal of one of said members to progressive combined radial and axial displacement to effect equalization of the pitch and intermeshing of the teeth with their flat surfaces overlapping, and limiting the extent of the radial displacement to maintain a clearance space between the opposed inclined faces of the teeth to permit relative radial movement of the interconnected members.

8. A valve seat for insertion in a recess surrounding a port passageway to be controlled, said seat being formed by outer and inner cylindrical rings of deformable metal having teeth on their inner and outer sides respectively, said rings being primarily of outer and inner diameter respectively so that the inner ring may be inserted into the outer ring to be concentric therewith and with the teeth of the rings opposed but entirely out of mesh, whereby by relative radial displacement of the metal of said rings, said teeth will be intermeshed to interlock the rings against relative axial displacement.

9. The method of interconnecting the inner and outer annular concentric metal members of a valve seat insert in which said members have on their opposed sides alternate complementary annular teeth and teeth grooves primarily out of mesh and with the pitch of the teeth and grooves on one member different from that of the pitch on the other member, which consists in holding one of said members against axial movement relative to the other member, subjecting said other member to pressure for axial and radial displacement of the metal thereof progressively from one end of said member to the other end thereof to progressively bring the pitch of the teeth and grooves on said member to the pitch of the teeth and grooves on the said one member for intermesh of the teeth on said members, and terminating said radial displacement before the teeth are fully bottomed in the grooves to leave spaces accommodating relative radial expansion and contraction of the members.

SAMUEL H. NORTON.